United States Patent [19]

Louzos et al.

[11] 4,385,103
[45] May 24, 1983

[54] NONAQUEOUS CELL HAVING AN ANTIMONY TRISULFIDE CATHODE

[75] Inventors: Demetrios V. Louzos, Rocky River; George E. Blomgren, Lakewood, both of Ohio

[73] Assignee: Union Carbide Corporation, Danbury, Conn.

[21] Appl. No.: 306,905

[22] Filed: Sep. 29, 1981

[51] Int. Cl.³ .............................................. H01M 6/14
[52] U.S. Cl. ..................................... 429/197; 429/218
[58] Field of Search ................. 429/197, 194, 218, 199

[56] References Cited

U.S. PATENT DOCUMENTS

| | | | |
|---|---|---|---|
| 3,933,520 | 1/1976 | Gay et al. | 136/6 LF |
| 3,959,012 | 5/1976 | Liang et al. | 429/191 |
| 3,988,164 | 10/1976 | Liang et al. | 429/191 |
| 4,057,678 | 11/1977 | Walker, Jr. | 429/104 |
| 4,223,079 | 9/1980 | Margalit et al. | 429/194 |
| 4,229,509 | 10/1980 | Margalit | 429/194 |
| 4,258,109 | 3/1981 | Liang et al. | 429/191 |

FOREIGN PATENT DOCUMENTS 2516703 10/1976 Fed. Rep. of Germany.
47-17935 2/1971 Japan.
47-17934 9/1972 Japan.

OTHER PUBLICATIONS

"Chalcogenides of As, Sb and Bi Positive Electrodes in Lithium Cells", Z. Naturforschung B: Anorg. Chem., Org. Chem., vol. 33B, No. 3, pp. 278-283, 1978.

*Primary Examiner*—Anthony Skapars
*Attorney, Agent, or Firm*—Cornelius F. O'Brien

[57] ABSTRACT

A nonaqueous cell employing an anode such as lithium, a liquid electrolyte based on organic solvents and a cathode of antimony trisulfide.

7 Claims, 1 Drawing Figure

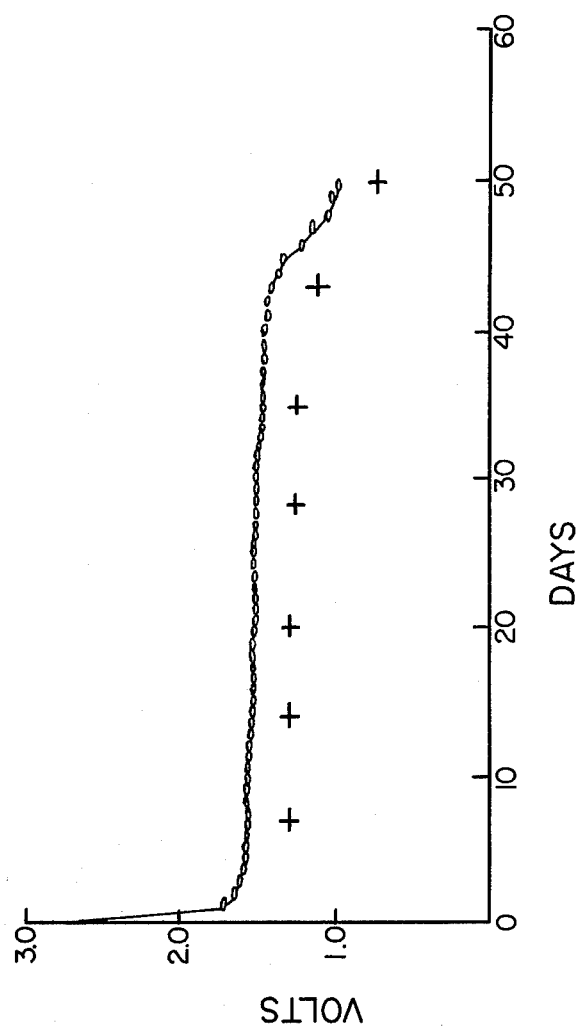

NONAQUEOUS CELL HAVING AN ANTIMONY TRISULFIDE CATHODE

FIELD OF THE INVENTION

The invention relates to a nonaqueous cell utilizing an active metal anode, a liquid electrolyte based on organic solvents and a cathode comprising antimony trisulfide.

BACKGROUND OF THE INVENTION

The development of high energy battery systems requires the compatibility of an electrolyte possessing desirable electrochemical properties with highly reactive anode materials, such as lithium, sodium, and the like and the efficient use of high energy density cathode materials. The use of aqueous electrolytes is precluded in these systems since the anode materials are sufficiently active to react with water chemically. It has, therefore, been necessary in order to realize the high energy density obtainable through the use of these highly reactive anodes and high energy density cathodes to turn to the investigation of nonaqueous electrolyte systems and more particularly to nonaqueous electrolyte systems based on organic solvents. A large number of nonaqueous electrolyte solutions based on organic solvents is taught in the art as being suitable for a wide variety of cell systems.

Although a large number of known solid cathode materials is suitable for nonaqueous cell systems, there is always a need for new solid cathode materials to help fill the demand created by the large number of battery-powered devices being marketed. For example, the toy industry has recently embarked upon a program of marketing a multiplicity of computerized games some of which are educational in nature. Many of these devices require portable power sources and, therefore, any new cell system would be welcomed.

While the theoretical energy, i.e., the electrical energy potentially available from a selected anode-cathode couple, is relatively easy to calculate, there is a need to choose a nonaqueous electrolyte for a couple that permits the actual energy produced by an assembled battery to approach the theoretical energy. The problem usually encountered is that it is practically impossible to predict in advance how well, if at all, a nonaqueous electrolyte will function with a selected couple. Thus a cell must be considered as a unit having three parts: a cathode, an anode, and an electrolyte, and it is to be understood that the parts of one cell are not predictably interchangeable with parts of another cell to produce an efficient and workable cell.

It is an object of the present invention to provide new solid cathode materials for liquid nonaqueous cell systems based on organic solvents.

It is another object of the present invention to provide a new nonaqueous cell system employing new solid cathode materials comprising antimony trisulfide.

It is another object of the present invention to provide a new nonaqueous cell system employing an active metal anode, an electrolyte based on 3-methyl-2-oxazolidone (3Me2Ox) as the organic solvent and an active cathode comprising antimony trisulfide.

SUMMARY OF THE INVENTION

The invention is directed to a new solid cathode material for nonaqueous electrolyte cell systems based on organic solvents which cathode material comprises antimony trisulfide ($Sb_2S_3$).

The antimony trisulfide can be mixed with a conductive agent such as graphite, carbon or the like and a binder such as Teflon (trademark for polytetrafluoroethylene), ethyleneacrylic acid copolymer or the like to produce a solid cathode electrode. If desired in some applications, another active cathode material could be utilized with antimony trisulfide to form the cathode of the cell.

Advantages of antimony trisulfide for use as an active cathode (electrochemically reducible) material in a nonaqueous electrolyte system based on organic solvents are:

(1) A fully discharged antimony trisulfide ($Sb_2S_3$) cathode does not exhibit excessive expansion as do other cathodes such as $FeS_2$.

(2) A lithium/$Sb_2S_3$ cell will deliver substantially its entire 6-electron theoretical $Sb_2S_3$ capacity on low drain conditions (about 0.15 milliampere per square centimeter).

(3) A lithium/$Sb_2S_3$ cell will discharge at a substantially unipotential level.

(4) A lithium/$Sb_2S_3$ cell will deliver a discharge voltage compatible with that of $Zn/MnO_2$ cells and $Zn/Ag_2O$ cells, thus making it interchangeable with such cells.

(5) Antimony trisulfide is located in many deposits throughout the world thus making it a readily available material for use in cell manufacture.

Useful highly active metal anode materials include the alkali metals, alkaline earth metals and alloys of alkali metals or alkaline earth metals and each other and other metals. The term "alloy" as used herein and in the appended claims is intended to include mixtures, solid solutions, such as lithium-magnesium and intermetallic compounds, such a lithium monoaluminide. The preferred anode materials are lithium, sodium, potassium, calcium and alloys thereof.

In nonaqueous cells, useful organic solvents employed alone or mixed with one or more other solvents for use in preparing electrolytes employed in the cell of this invention include the following classes of compounds:

Alkylene nitriles: e.g., crotonitrile (liquid range −51.1° C. to 120° C.)

Trialkyl borates: e.g., trimethyl borate, $(CH_3O)_3B$ (liquid range −29.3° to 67° C.)

Tetraalkyl silicates: e.g., tetramethyl silicate, $(CH_3O)_4Si$ (boiling point 121° C.)

Nitroalkanes: e.g., nitromethane, $CH_3NO_2$ (liquid range −17° to 100.8° C.) Alkylnitriles: e.g., acetonitrile, $CH_3CN$ (liquid range −45° to 81.6° C.)

Dialkylamides: e.g., dimethylformamide, $HCON(CH_3)_2$ (liquid range −60.48° to 149° C.)

Lactams: e.g., N-methylpyrrolidone,

(liquid range −16° to 202° C.)

Tetraalkylureas: e.g., tetramethylurea, $(CH_3)_2N—CO—N(CH_3)_2$ (liquid range −1.2° to 166° C.)

Monocarboxylic acid esters: e.g., ethyl acetate (liquid range −83.6° to 77.06° C.)

Orthoesters: e.g., trimethylorthoformate, HC(OCH3)3 (boiling point 103° C.)

Lactones: e.g., γ-(gamma) butyrolactone,

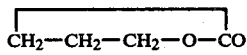

(liquid range −42° to 206° C.)

Dialkyl carbonates: e.g., dimethyl carbonate, OC-(OCH3)2 (liquid range 2° to 90° C.)

Alkylene carbonates: e.g., propylene carbonate,

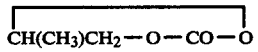

(liquid range −48° to 242° C.)

Monoethers: e.g., diethyl ether (liquid range −116° to 34.5° C.)

Polyethers: e.g., 1,1-and 1,2-dimethoxyethane (liquid ranges −113.2° to 64.5° C. and −58° to 83° C., respectively)

Cyclic ethers: e.g., tetrahydrofuran (liquid range −65° to 67° C.); 1,3-dioxolane (liquid range −95° to 78° C.)

Nitroaromatics: e.g., nitrobenzene (liquid range 5.7° to 210.8° C.)

Aromatic carboxylic acid halides: e.g., benzoyl chloride (liquid range 0° to 197° C.); benzoyl bromide (liquid range −24° to 218° C.)

Aromatic sulfonic acid halides: e.g., benzene sulfonyl chloride (liquid range 14.5° to 251° C.)

Aromatic phosphonic acid dihalides: e.g., benzene phosphonyl dichloride (boiling point 258° C.)

Aromatic thiophosphonic acid dihalides: e.g., benzene thiophosphonyl dichloride (boiling point 124° C. at 5 mm.)

Cyclic sulfones: e.g., sulfolane,

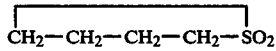

(melting point 22° C.); 3-methylsulfolane (melting point −1° C.)

Alkyl sulfonic acid halides: e.g., methanesulfonyl chloride (boiling point 161° C.)

Alkyl carboxylic acid halides: e.g., acetyl chloride (liquid range −112° to 50.9° C.); acetyl bromide (liquid range −96° to 76.° C.); propionyl chloride (liquid range −94° to 80° C.)

Saturated heterocyclics: e.g., tetrahydrothiophene (liquid range −96° to 121° C.); 3-methyl-2-oxazolidone (melting point 15.9° C.)

Dialkyl sulfamic acid halides: e.g., dimethyl sulfamyl chloride (boiling point 80° C. at 16 mm.)

Alkyl halosulfonates: e.g., ethyl chlorosulfonate (boiling point 151° C.)

Unsaturated heterocyclic carboxylic acid halides: e.g., 2-furoyl chloride (liquid range −2° to 173° C.)

Five-membered unsaturated heterocyclics: e.g., 3,5-dimethylisoxazole (boiling point 140° C.); 1-methylpyrrole (boiling point 114° C.); 2,4-dimethylthiazole (boiling point 144° C.); furan (liquid range −85.65° to 31.36° C.)

Esters and/or halides of dibasic carboxylic acids: e.g., ethyl oxalyl chloride (boiling point 135° C.)

Mixed alkyl sulfonic acid halides and carboxylic acid halides: e.g., chlorosulfonyl acetyl chloride (boiling point 98° C. at 10 mm.)

Dialkyl sulfoxides: e.g., dimethyl sulfoxide (liquid range 18.4 to 189° C.)

Dialkyl sulfates: e.g., dimethylsulfate (liquid range −31.75° to 188.5° C.)

Dialkyl sulfites: e.g., dimethylsulfite (boiling point 126° C.)

Alkylene sulfites: e.g., ethylene glycol sulfite (liquid range −11° to 173° C.)

Halogenated alkanes: e.g., methylene chloride (liquid range −95° to 40° C.); 1,3-dichloropropane (liquid range −99.5° to 120.4° C.)

Of the above, the preferred solvents are sulfolane; tetrahydrofuran; 1,3-dioxolane; 3-methyl-2-oxazolidone; propylene or ethylene carbonate; γ-butyrolactone; 1,2-dimethoxyethane and mixtures thereof because they appear more chemically inert to battery components and have wide liquid ranges, and especially because they permit highly efficient utilization of the cathode materials.

A preferred electrolyte solution for use in this invention is a 3-methyl-2-oxazolidone-based electrolyte solution. Liquid organic 3-methyl-2-oxazolidone material, (3Me2Ox)

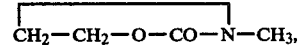

is an excellent nonaqueous solvent because of its high dielectric constant, chemical inertness to battery components, wide liquid range and low toxicity.

However, it has been found that when metal salts are dissolved in liquid 3Me2Ox for the purpose of improving the conductivity of 3Me2Ox, the viscosity of the solution may be too high for its efficient use as an electrolyte for some nonaqueous cell applications other than those requiring very low current drains. Thus, in some applications in accordance with this invention, the addition of a low viscosity cosolvent would be desirable if 3Me2Ox is to be used as an electrolyte for nonaqueous cells which can operate or perform at a high energy density level.

The low viscosity cosolvents which can be used along with 3Me2Ox include tetrahydrofuran (THF), methyl-substituted tetrahydrofuran (Met-THF), dioxolane, (DIOX), dimethoxyethane (DME), or the like. Dimethoxyethane (DME), dioxolane (DIOX) and tetrahydrofuran (THF) are preferred cosolvents because of their compatibility with metal salts dissolved in liquid 3Me2Ox and their chemical inertness to cell components. Specifically, the total amount of the low viscosity cosolvent added could be between about 20% and about 80% based on total solvent volume, i.e., exclusive of solute, so as to lower the viscosity to a level suitable for use in a high drain cell.

The ionizing solute for use in the invention may be a simple or double salt or mixtures thereof, e.g., LiCF3SO3 or LiClO4, which will produce an ionically conductive solution when dissolved in one or more solvents. Useful solutes include complexes of inorganic or organic Lewis acids and inorganic ionizable salts. The only requirements for utility are that the salts, whether simple or complex, be compatible with the solvent or solvents being employed and that they yield a solution which is sufficiently ionically conductive. According to the Lewis or electronic concept of acids and bases, many substances which contain no active hydrogen can act as acids or acceptors of electron doublets. The basic concept is set forth in the chemical literature (Journal of the Franklin Institute, Vol 226, July/December 1938, pages 293–313 by G. N. Lewis).

A suggested reaction mechanism for the manner in which these complexes function in a solvent is described in detail in U.S. Pat. No. 3,542,602 wherein it is suggested that the complex or double salt formed between the Lewis acid and the ionizable salt yields an entity which is more stable than either of the components alone.

Typical Lewis acids suitable for use in the present invention include aluminum fluoride, aluminum bromide, aluminum chloride, antimony pentachloride, zirconium tetrachloride, phosphorus pentachloride, boron fluoride, boro chloride and boron bromide.

Ionizable salts useful in combination with the Lewis acids include lithium fluoride, lethium chloride, lithium bromide, lithium sulfide, sodium fluoride, sodium chloride, sodium bromide, potassium fluoride, potassium chloride and potassium bromide.

It will be obvious to those skilled in the art that the double salts formed by a Lewis acid and an inorganic ionizable salt may be used as such or the individual components may be added to the solvent separately to form the double salt or the resulting ions in situ. One such double salt, for example, is that formed by the combination of boron fluoride and lithium fluoride to yield lithium tetrafluoroborate.

A separator for use in this invention has to be chemically inert and insoluble in the cell system and have a porosity so as to permit the liquid electrolyte to permeate through and contact the anode of the cell, thus establishing an ion transfer path between the anode and cathode.

The container housing for the cell can be made of stainless steel or some other conductive material that will not corrode or otherwise deteriorate when in contact with the cell materials.

The insulating member disposed between the cover and the container has to be stable in the presence of the cell components and can be selected from such materials as polytetrafluoroethylene, fluorinated ethylene-propylene copolymer, polychlorotrifluoroethylene, perfluoro-alkoxy polymer, polyvinyl, polyethylene, polypropylene, polystyrene, nylon, etc.

BRIEF DESCRIPTION OF THE DRAWING

The sole FIGURE contains data showing the discharge characteristics of the cell disclosed and described in the example.

EXAMPLE

A flat-type cell was constructed utilizing a stainless steel base having therein a shallow depression into which the cell contents were placed and over which a spring-loaded stainless steel plate was placed. The contents of the cell consisted of four 0.375 inch diameter lithium discs (0.174 gram) having a total thickness of 0.180 inch (representing excess anode material), about 0.5 ml of an electrolyte consisting of about 40 vol. % 1,3-dioxolane, about 30 vol. % 1,2-dimethoxyethane (DME), about 30 vol. % 3Me2Ox plus about 0.1% dimethylisoxazole (DMI) and containing 1 M LiCF$_3$SO$_3$, a 0.45 inch diameter porous nonwoven polypropylene separator (0.01 inch thick) which absorbed some of the electrolyte and 0.302 gram of a cathode mix compressed to form a cathode having a solids packing of 59%. The cathode mix consisted of 0.2266 gram of antimony trisulfide (Sb$_2$S$_3$), 0.0395 gram of graphite, 0.0085 gram of acetylene black and 0.0271 gram of polytetrafluoroethylene. The cell was discharged across a 15 K-ohm load and the voltage observed with time is shown as the curve in the FIGURE. In addition, at various time periods, the cell was discharged across a 1 K-ohm load (pulse discharge) for about 2 seconds, and the voltages observed are shown as the points identified as "+" in the FIGURE. As evident from the Example, the cell of this invention had a relatively unipotential discharge for more than 40 days and delivered 107 milliampere-hours to a 1.2 volt cutoff. Based on a 6-electron discharge reaction for Sb$_2$S$_3$, this cell delivered 100% of its theoretical capacity.

While the present invention has been described with reference to many particular details thereof, it is not intended that these details shall be construed as limiting the scope of this invention.

What is claimed is:

1. A nonaqueous cell comprising an anode, an electrolyte solution based on an organic solvent and a cathode, said cathode comprising antimony trisulfide (Sb$_2$S$_3$) in a physical mixture with a carbonaceous conductor.

2. The nonaqueous cell of claim 1, wherein the cathode contains a binder.

3. The nonaqueous cell of claim 1 wherein the cathode contains a conductive agent of carbon or graphite and a binder of polytetrafluoroethylene or ethylene-acrylic acid copolymer.

4. The nonaqueous cell of claim 1, 2, or 3 wherein said anode is selected from the group consisting of lithium, potassium, sodium, calcium, magnesium and alloys thereof.

5. The nonaqueous cell of claim 4 wherein the organic solvent comprises at least one solvent selected from the group consisting of 3-methyl-2-oxazolidone, 1,3-dioxolane, and 1,2-dimethoxyethane.

6. The nonaqueous cell of claim 4 wherein the organic solvent comprises 3-methyl-2-oxazolidone, 1,3-dioxolane and 1,2-dimethoxyethane.

7. The nonaqueous cell of claim 1 wherein the anode is lithium and the electrolyte solution comprises LiCF$_3$SO$_3$ dissolved in 3-methyl-2-oxazolidone, 1,3-dioxolane and 1,2-dimethoxyethane.

* * * * *